(12) United States Patent
Jotshi et al.

(10) Patent No.: US 11,228,501 B2
(45) Date of Patent: *Jan. 18, 2022

(54) APPARATUS AND METHOD FOR OBJECT CLASSIFICATION BASED ON IMAGERY

(71) Applicant: AT&T Intellectual Property I, L.P., Atlanta, GA (US)

(72) Inventors: Arun Jotshi, Parsippany, NJ (US); Kathleen Meier-Hellstern, Cranbury, NJ (US); Gaurav Thakur, Matawan, NJ (US); Shang Li, Aberdeen, NJ (US); Velin Kounev, Weehawken, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 119 days.

This patent is subject to a terminal disclaimer.

(21) Appl. No.: 16/437,057

(22) Filed: Jun. 11, 2019

(65) Prior Publication Data

US 2020/0396134 A1    Dec. 17, 2020

(51) Int. Cl.
*H04L 12/24* (2006.01)
*G06K 9/00* (2006.01)
*G06T 7/70* (2017.01)
*G06K 9/40* (2006.01)

(52) U.S. Cl.
CPC ........ *H04L 41/145* (2013.01); *G06K 9/00637* (2013.01); *G06K 9/00657* (2013.01); *G06K 9/40* (2013.01); *G06T 7/70* (2017.01); *G06T 2207/30184* (2013.01)

(58) Field of Classification Search
CPC ....... H04W 16/18; H04L 41/145; H04L 41/22
See application file for complete search history.

(56) References Cited

U.S. PATENT DOCUMENTS

| | | | |
|---|---|---|---|
| 9,736,649 B1 * | 8/2017 | Do | H01Q 1/24 |
| 10,425,832 B1 | 9/2019 | Zawadzki et al. | |
| 10,455,540 B2 * | 10/2019 | Balappanavar | H04W 4/029 |
| 10,693,730 B2 | 6/2020 | Harpur et al. | |
| 10,728,769 B1 * | 7/2020 | Jotshi | G06K 9/00664 |

(Continued)

OTHER PUBLICATIONS

"Deep Networks for Earth Observation", GitHub—nshaud/DeepNetsForEO: Deep networks for Earth Observation; https://github.com/nshaud/DeepNetsForEO, May 7, 2019.

(Continued)

*Primary Examiner* — Zhiren Qin
(74) *Attorney, Agent, or Firm* — Guntin & Gust, PLC; Mark Wilinski

(57) ABSTRACT

Aspects of the subject disclosure may include, for example, identifying a first object included in at least one image in accordance with an execution of an image processing algorithm, analyzing a plurality of parameters in accordance with at least one model responsive to the identifying of the first object included in the at least one image, wherein each parameter of the plurality of parameters is associated with the first object or a second object, selecting one of the first object or the second object for receiving at least one communication network resource responsive to the analyzing of the plurality of parameters, wherein the selecting results in a selected object, and presenting the selected object on a presentation device. Other embodiments are disclosed.

20 Claims, 9 Drawing Sheets

(56) References Cited

U.S. PATENT DOCUMENTS

| | | | |
|---|---|---|---|
| 2006/0083170 A1 | 4/2006 | Silva et al. | |
| 2006/0106530 A1 | 5/2006 | Horvitz et al. | |
| 2007/0088709 A1 | 4/2007 | Bailey et al. | |
| 2010/0014441 A1 | 1/2010 | Middleton-hand et al. | |
| 2011/0194456 A1 | 8/2011 | Fordham et al. | |
| 2016/0037356 A1* | 2/2016 | Bathula | H04W 16/18 |
| | | | 455/446 |
| 2016/0078272 A1* | 3/2016 | Hammoud | G06K 9/6268 |
| | | | 382/103 |
| 2017/0041806 A1* | 2/2017 | Randall | H04W 16/22 |
| 2017/0257778 A1* | 9/2017 | Priest | H04N 7/185 |
| 2018/0139623 A1* | 5/2018 | Park | G06T 7/70 |
| 2018/0157911 A1* | 6/2018 | Lo | G06K 9/6267 |
| 2019/0075430 A1* | 3/2019 | Lincoln | H04W 24/10 |
| 2019/0354741 A1* | 11/2019 | Yang | G06K 9/0063 |
| 2020/0082168 A1* | 3/2020 | Fathi | B64C 39/024 |
| 2020/0096999 A1* | 3/2020 | Pellerite | B64C 39/024 |
| 2020/0104503 A1* | 4/2020 | Iwasaki | G06F 8/65 |
| 2020/0178085 A1 | 6/2020 | Ertimo et al. | |
| 2020/0304219 A1* | 9/2020 | Park | H04B 17/391 |
| 2021/0014698 A1 | 1/2021 | Meier-hellstern et al. | |

OTHER PUBLICATIONS

"DigitalGlobe", Elevate your perspective. MDS, Radian Solutions, SSL; http://digitalglobe.com, 2019.

"Neapmap", Park Your Truck, https://go.nearmatp.com/, 2019.

* cited by examiner

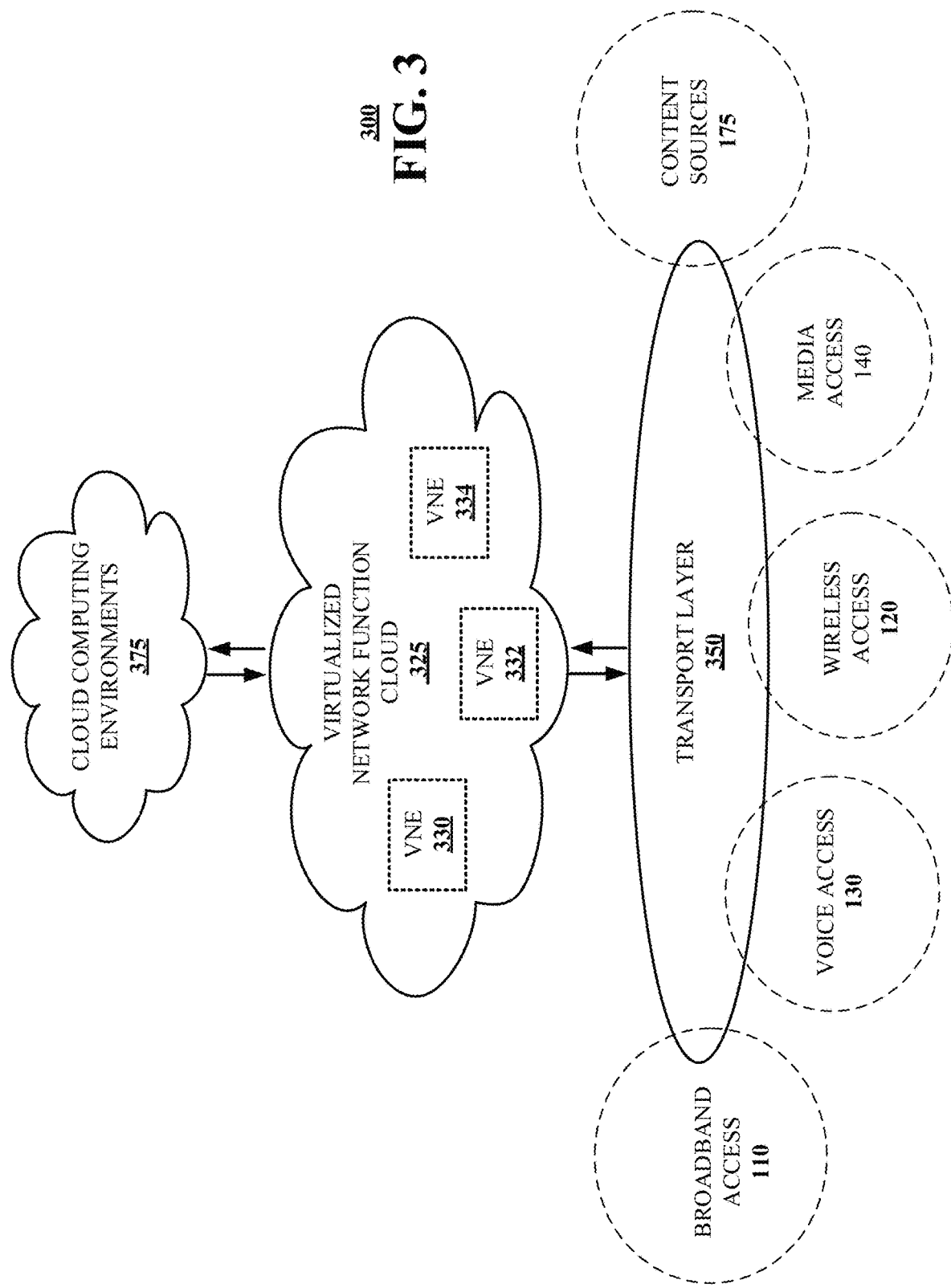

APPARATUS AND METHOD FOR OBJECT
CLASSIFICATION BASED ON IMAGERY

FIELD OF THE DISCLOSURE

The subject disclosure relates to an apparatus and method for object classification based on imagery.

BACKGROUND

As the world continues to become increasingly connected over vast/various communication networks, network/service operators/providers are continuously confronted with the challenge of providing efficient, high-quality service to users/devices. For example, as a network/service operator seeks to implement additional resources to support an existing network, or is providing resources in the first instance (such as during an initial deployment of a given, new network), technicians/site surveyors are dispatched to identify candidate locations/objects (e.g., utility poles) that will best serve as a host site of the resources. Reports/Data prepared/gathered by the technicians are subsequently reviewed/analyzed by, e.g., engineers to ultimately select a location/object from the candidate locations/objects. Thus, the identification/selection of a location/object is time and labor intensive and is susceptible to error (e.g., is susceptible to misinterpretation or miscommunication between technicians and engineers), potentially resulting in costly rework and increased product/service development cycle times. Still further, the reports/data may potentially miss/overlook/ignore information, such that a selected candidate location might not be the optimum location. As a result, the service that is obtained/provided by the resources when deployed/implemented may be sub-optimal in some instances.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for identifying/selecting one or more objects for placement/deployment of one or more resources (e.g., communication network resources). Other embodiments are described in the subject disclosure.

One or more aspects of the subject disclosure include obtaining an image that is sourced from a vehicle, applying the image to a model to identify a plurality of objects in the image, identifying a plurality of attributes associated with each of the plurality of objects, obtaining data, wherein the data identifies a location of each object of the plurality of objects, and selecting an object included in the plurality of objects for deployment of a communication network resource in accordance with the plurality of attributes and the data One or more aspects of the subject disclosure include obtaining a plurality of images, wherein the plurality of images is captured by a vehicle, a user equipment, or any combination thereof, identifying a first object included in the plurality of images via an application of the plurality of images to at least one model that comprises a machine learning model, identifying at least one attribute associated with the first object responsive to the identifying of the first object, generating a recommendation that identifies the first object or a second object for receiving a network resource responsive to the identifying of the at least one attribute, and presenting the recommendation on a presentation device.

One or more aspects of the subject disclosure include identifying a first object included in at least one image in accordance with an execution of an image processing algorithm, analyzing a plurality of parameters in accordance with at least one model responsive to the identifying of the first object included in the at least one image, wherein each parameter of the plurality of parameters is associated with the first object or a second object, selecting one of the first object or the second object for receiving at least one communication network resource responsive to the analyzing of the plurality of parameters, wherein the selecting results in a selected object, and presenting the selected object on a presentation device.

Figure 1:
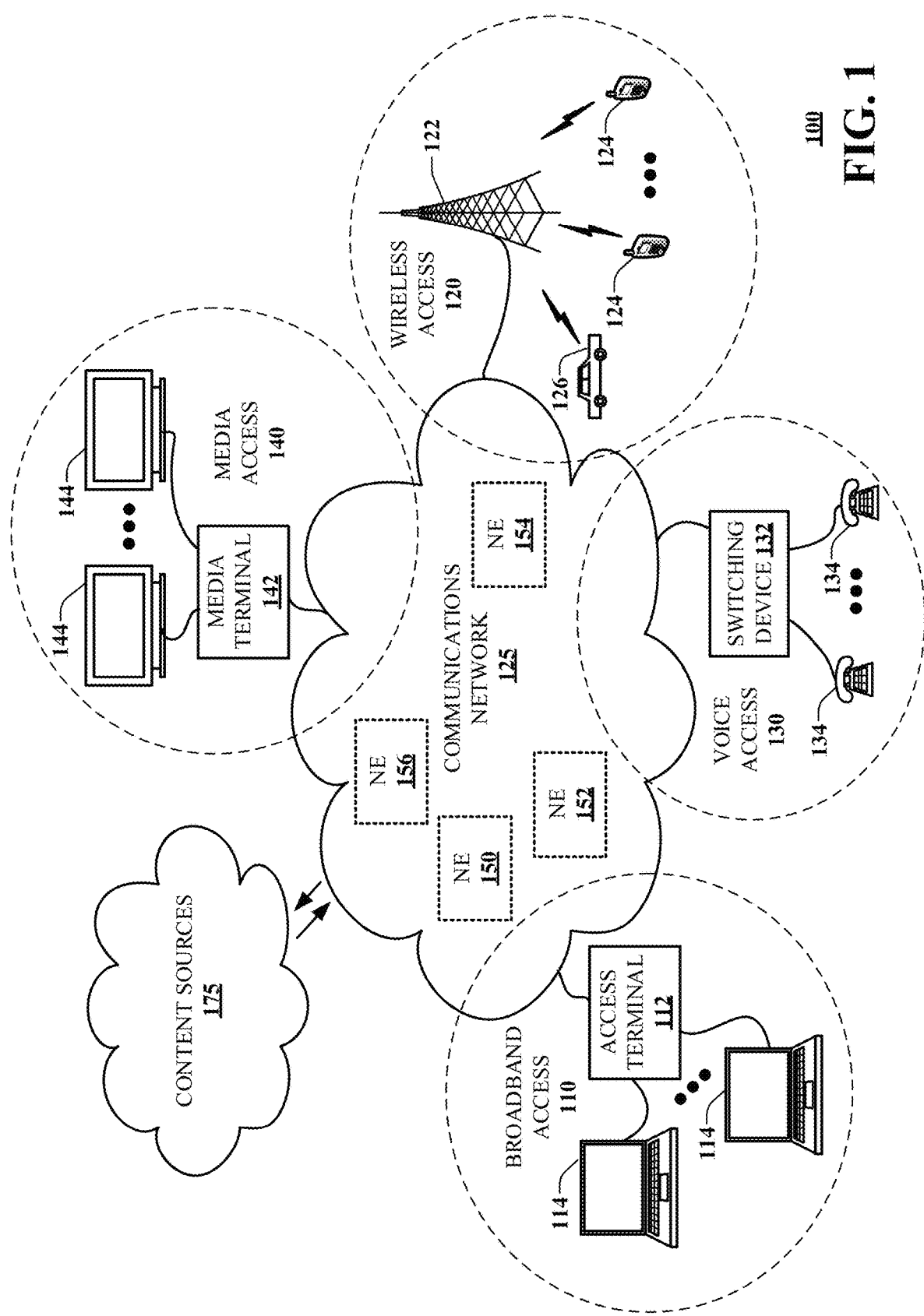
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part obtaining an image that is sourced from a vehicle, applying the image to a model to identify a plurality of objects in the image, identifying a plurality of attributes associated with each of the plurality of objects, obtaining data, wherein the data identifies a location of each object of the plurality of objects, and selecting an object included in the plurality of objects for deployment of a communication network resource in accordance with the plurality of attributes and the data. Communications network 100 can facilitate in whole or in part obtaining a plurality of images, wherein the plurality of images is captured by a vehicle, a user equipment, or any combination thereof, identifying a first object included in the plurality of images via an application of the plurality of images to at least one model that comprises a machine learning model, identifying at least one attribute associated with the first object responsive to the identifying of the first object, generating a recommendation that identifies the first object or a second object for receiving a network resource responsive to the identifying of the at least one attribute, and presenting the recommendation on a presentation device. Communications network 100 can facilitate in whole or in part identifying a first object included in at least one image in accordance with an execution of an image processing algorithm, analyzing a plurality of parameters in accordance with at least one model responsive to the identifying of the first object included in the at least one image, wherein each parameter of the plurality of parameters is associated with the first object or a second object, selecting one of the first object or the second object for receiving at least one communication network resource responsive to the analyzing of the plurality of parameters, wherein the selecting results in a selected object, and presenting the selected object on a presentation device.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
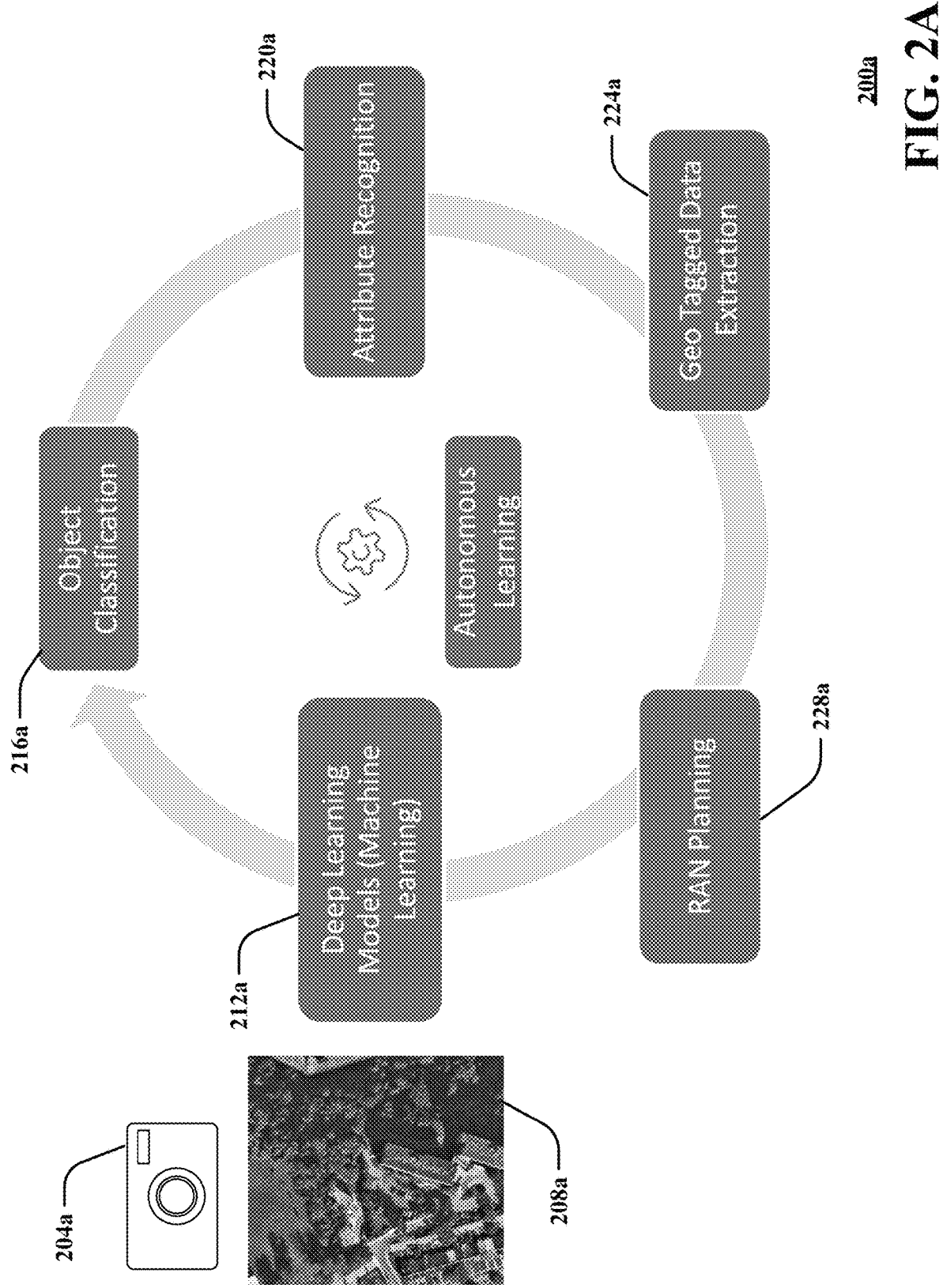
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within, or operatively overlaid upon, the communication network 100 of FIG. 1 in accordance with various aspects described herein. In some embodiments, aspects of the system 200a may be at least partially implemented in hardware, software, firmware, or any combination thereof.

The system 200a may incorporate various types/kinds of image capture equipment, illustratively depicted as a camera 204a in FIG. 2A. For example, the image capture equipment 204a may include a vehicle, such as an aircraft (e.g., fixed-wing aircraft, rotary aircraft, etc.), a spacecraft (e.g., satellites), a motor vehicle (e.g., a car, a truck, a bus, an all-terrain vehicle etc.), a train/railcar/locomotive, a marine craft (e.g., a boat, a ship, a ferry, a yacht, etc.), a bicycle, etc. In some embodiments, the image capture equipment 204a may include user equipment (UE)/client devices, such as for example handheld cameras, mobile devices (e.g., smartphones), etc.

The image capture equipment 204a may be used to generate/create one or more images, illustratively depicted as an image 208a in FIG. 2A. The images 208a generated by the image capture equipment 204a may be generated from various vantage points and at various perspectives. For example, such vantage points/perspectives may include a bird's eye/top-down view, oblique angles, a street-side or street-view perspective, etc. The images may be obtained directly from the image capture equipment 204a and/or may be obtained indirectly from the image capture equipment 204a via one or more third-party sites/service/devices. In the context of the vehicular image capture equipment described above, the images may be captured when the vehicle is at rest/on the ground and/or when the vehicle is in operation/deployed (e.g., in motion).

In some embodiments, the image capture equipment 204a may process an image 208a to generate a processed image. For example, the image capture equipment 204a may apply one or more filters to image data of the image 208a to enhance a particular object and/or de-emphasize another object in the processed image. Still further, in some embodiments the image capture equipment 204a may combine various images 208a as part of the processing to generate a composite image. In this respect, raw images and/or processed images may be represented via reference character 208a in FIG. 2A. In some embodiments, the processing of the images 208a may be at least partially performed by one or more other components/devices. The processing of the images 208a may be performed in accordance with one or more image processing algorithms.

The images 208a may be provided to (e.g., may serve as input to) one or more models 212a. The models 212a may incorporate aspects of machine learning (ML) and/or artificial intelligence (AI). In some embodiments, the models 212a may incorporate aspects of deep learning (DL). For example, in some embodiments the models 212a may use a cascade of layers for purposes of feature extraction and/or transformation, whereby a second/successive layer may utilize an output from a first/prior layer as input. Learning/Development in/of the models 212a may occur in a supervised or unsupervised manner. For example, aspects of a supervised model may be based on one or more classifications. An unsupervised model may leverage pattern analysis techniques.

To take an illustrative example, in some embodiments a first layer of a model 212a may abstract raw image data (e.g., pixels) of an image 208a and encode edges of the image 208a. A second layer of the model 212a may compose and encode arrangements of the edges. A third layer may encode one or more objects contained within the image 208a. A fourth layer may identify the objects by appending one or more tags, labels, etc., to the image 208a as, e.g., metadata.

More generally, aspects of ML, AI, and/or DL may serve to identify which characteristics of an image 208a (or, analogously, image data) pertain to which layer of the model 212a and slot/allocate such characteristics within the model 212a (e.g., the layer), accordingly. In some embodiments, the model 212a may be adapted/modified/tuned in accordance with one or more user inputs. For example, user inputs may influence the count/number of layers that are included in a given model and/or parameters of the layers.

In some embodiments, a model 212a that is generated/created may be static in nature. A static model may facilitate consistency and ease in terms of a comparison of outputs (e.g., predicted values of outputs) of the model over time (or between different instances of an execution of the model). In some embodiments, a model 212a that is generated/created may be adapted/modified/updated in response to a change in one or more conditions/inputs, resulting in a modified model. For example, aspects of the model may incorporate a feedback representative of an error between the predicted values of outputs as generated by the model relative to actual values for the outputs (which may be obtained via one or more out-of-band communication links/channels); this feedback/error may be used to modify one or more parameters/characteristics of the model. In this respect, the predicted values and the actual values of the outputs may tend to converge (e.g., the error may tend to converge towards zero), such that the model may tend to become more accurate/consistent over time in terms of its prediction capabilities.

Figure 2B:
FIG. 2B depicts an illustrative embodiment of a processed image that identifies objects in accordance with various aspects described herein.

An execution/invocation of the model(s) 212a may result in a classification of one or more objects (denoted via reference character 216a in FIG. 2A). To demonstrate, execution of the model(s) 212a upon/relative to the image 208a may result in an identification/classification 216a of objects 208b-1 through 208b-4 as shown in FIG. 2B. For example, and referring to FIGS. 2A-2B, an execution of the model(s) 212a may identify/classify a first object 208b-1 as a building, a second object 208b-2 as a pole (e.g., a lightpole, a utility pole, etc.), a third object 208b-3 as a tower (e.g., a communications tower), and a fourth object 208b-4 as foliage (e.g., as part of a plant/tree).

Once the objects (e.g., the objects 208b-1 through 208b-4) have been classified in accordance with the object classification 216a, one or more attributes of, e.g., the object may be identified/recognized (as denoted via reference character 220a in FIG. 2A).

Attributes 220a of the first object/building 208b-1 may include an identification of one or more trusses of the building 208b-1, one or more pilings of the building 208b-1, a size/dimension (e.g., a height or footprint) of the building 208b-1, a dimension/style of a roof of the building 208b-1, a material of the roof, etc.

Attributes 220a of the second object/pole 208b-2 may include, e.g., a dimension (e.g., a height, a circumference, a diameter) of the pole 208b-2, an identification of one or more attachment mechanisms/attachments presently on the pole 208b-2 (e.g., when the image was captured) or capable of being incorporated on the pole 208b-2, an identification of transmission media (e.g., power cables, telephone lines, etc.) and/or signaling equipment (e.g., a stop-light) presently on the pole 208b-2 or capable of being incorporated on the pole 208b-2, a material of the pole 208b-2, etc. To the extent that the attributes 220a of the pole 208b-2 identify attachment mechanisms, transmission media, and/or signaling equipment, the attributes may also specify a location of the same relative to a reference location.

Attributes 220a of the third object/tower 208b-3 may include, e.g., a dimension of the tower 208b-3, an identification of one or more attachment mechanisms/attachments presently on the tower 208b-3 (e.g., when the image was captured) or capable of being incorporated on the tower 208b-3, an identification of communications equipment (e.g., transmitters, receivers, antennas, etc.) presently on the tower 208b-3 or cable of being incorporated on the tower 208b-3, a material of the tower 208b-3, etc. To the extent that the attributes 220a of the tower 208b-3 identify attachment mechanisms and/or communications equipment, the attributes may also specify a location of the same relative to a reference location.

Attributes 220a of the fourth object/foliage 208b-4 may include, e.g., a dimension (e.g., a height) of the foliage 208b-4, an identification/specification of a thickness/density of the foliage 208b-4, an identification of a type of plant/tree (e.g., oak, maple, pine, etc.) associated with the foliage 208b-4, etc. The attributes 220a of the foliage 208b-4 may provide an indication of how frequently the foliage 208b-4 may need to be tended to (e.g., how frequently the foliage 208b-4 may be need to be subject to maintenance) and/or may provide an indication of an impact on network service/performance in terms of a lack of action/inactivity with respect to a maintenance of the foliage 208b-4.

Once the attributes 220a are obtained, data (e.g., geography [geo] tagged data) may be obtained/extracted (as denoted via reference character 224a in FIG. 2A). For example, the extraction of the data 224a may supplement the object classification 216a and attributes 220a associated with the objects to obtain an understanding of a topology/landscape associated with a network (or a potential network that is being deployed as part of the implementation of the system 200a). To demonstrate, in respect of objects 208b-1 through 208b-4 of FIG. 2B, the data 224a of FIG. 2A may identify a proximity of a given object (e.g., object 208b-1) to one or more cell sites, backbone network infrastructure (e.g., one or more cable bundles, optical fiber trunks, repeaters, couplers, etc.), etc.

In some embodiments, the data 224a may include a specification of restrictions (or, analogously, rights-of-way, easements, etc.), as potentially imposed/overseen by a given jurisdiction, a governmental entity (e.g., a local or regional board of officials), and/or a private party. For example, if the pole 208b-2 is a historical/decorative light-post, a town/city may impose an ordinance that communications equipment (or the like) may be prohibited from appearing on the light-post in order to avoid detracting from the aesthetics of the light-post. Conversely, if the pole 208b-2 is used in a transmission of electrical power (as potentially identified via the attributes 220a), an agreement between an electrical power provider and a communications equipment provider may allow for communications equipment of the communications equipment provider to be placed on (e.g., mounted to) the pole 208b-2 as long as a (minimum) clearance is maintained between the communications equipment and electrical power generation and/or distribution equipment (e.g., a transformer).

In some embodiments, the data 224a may identify materials used in the manufacture/fabrication of an object. In some embodiments, the data 224a may identify patterns in terms of a given object (e.g., instances of the pole 208b-2 spaced/separated 'X' meters apart).

In some embodiments, the data 224a may include information associated with a communication system. For example, the data 224a may include information (e.g., statistics) regarding signal quality parameters (e.g., received signal strength, interference or noise, etc.) of the communication system.

The classified objects 216a, the attributes 220a, and the data 224a may be provided as inputs to a planning component, illustratively denoted as a radio access network (RAN) planning component 228a. The planning component 228a may analyze the inputs that it receives/obtains to identify a subset of the classified objects 216a as candidates for a potential placement of network resources (e.g., network equipment). Still further, the planning component 228a may provide recommendations for selecting (and may perform a selection of) one or more of the objects from the pool of candidates. The planning component 228a may provide an indication of how a placement of a given resource on a given object (or, analogously, at a given location) may impact other resources (on a qualitative and/or quantitative basis).

In some embodiments, the planning component 228a may generate and provide one or more outputs on the basis of additional inputs (e.g., inputs beyond the classified objects 216a, the attributes 220a, and the data 224a). For example, if a utility/power company is erecting new poles in a given geographical area at a given rate (e.g., five poles per month), the planning component 228a may take the rate of pole erection into account when deciding when and where to allocate network resources. Stated differently, aspects of the planning component 228a may take into consideration future events or conditions that have a probabilistic chance of occurring in generating one or more outputs. In this regard, aspects of the planning component 228a may include elements of forecasting.

In some embodiments, inputs to the planning component 228a may include a specification of a number of users/devices subscribed to one or more services (e.g., one or more data or communication services), types of users (e.g., single user, family plan, etc.) or devices (e.g., make, model, serial number) that are subscribed, traffic/network loads (on a historical basis, on an actual/current basis, and/or on a forecasted basis), types of communications sessions that are supported, etc. In some embodiments, the inputs to the planning component 228a may include trends in population growth/decline (e.g., number of people moving to or leaving a given geographical area or jurisdiction). Analysis of trends may enable a network/service operator to anticipate demand for services and respond proportionately/accordingly.

Aspects of the system 200a may be invoked/executed repeatedly/iteratively to obtain an allocation of resources relative to objects/locations. For example, between instances of an execution of the system 200a one or more parameters may be modified to obtain a range of values associated with one or more outputs. Still further, a given parameter may be dithered to obtain insight into the sensitivity of one or more of the outputs/output values relative to the given parameter. In some embodiments, aspects of the system 200a (e.g., the data 224a) may be updated/refreshed at a given rate, or in response to one or more events or conditions, in order to ensure that the outputs generated and provided by the system 200a are accurate (e.g., in order to ensure that the data 224a does not become stale).

Figure 2C:
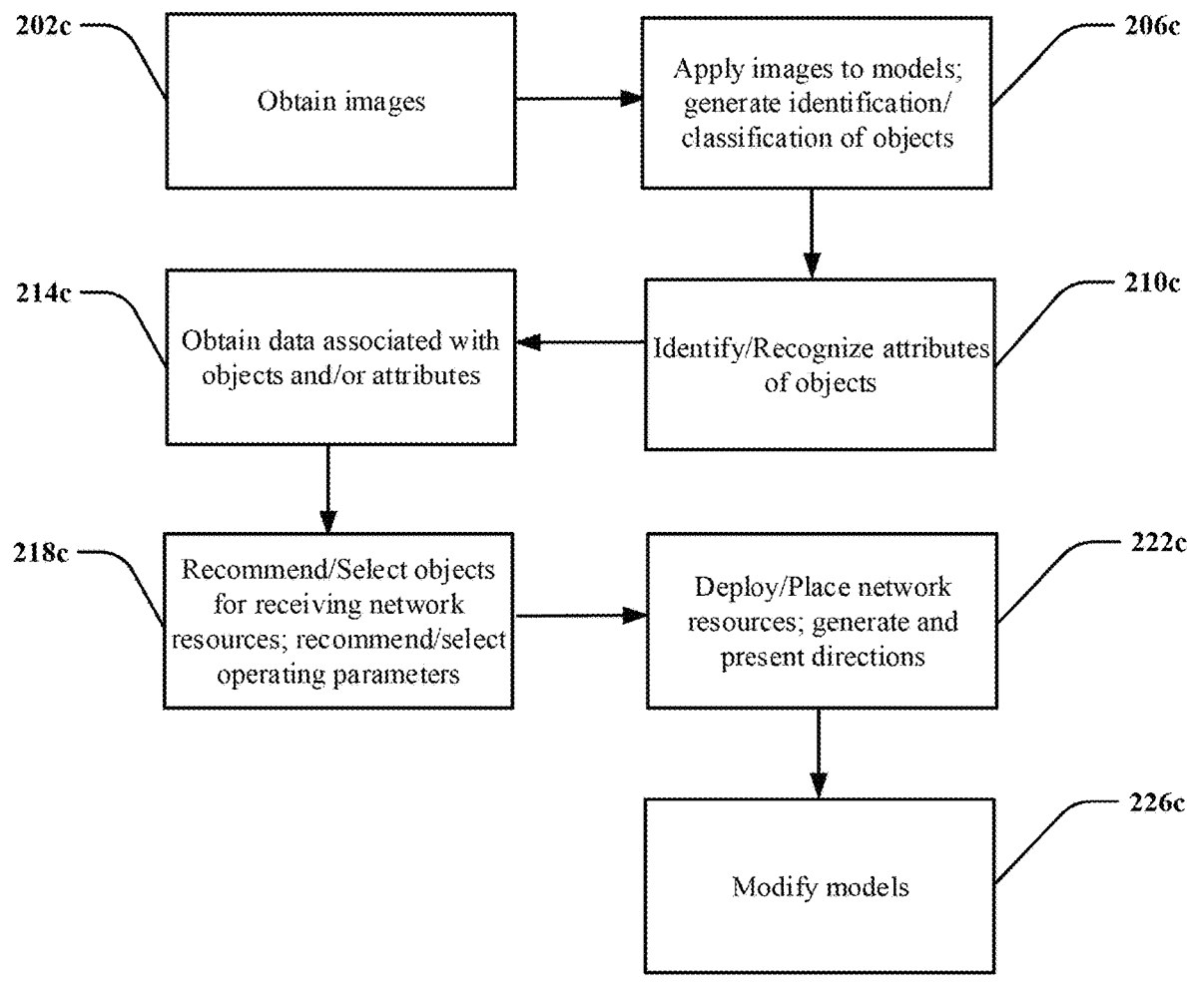
FIG. 2C depicts an illustrative embodiment of a method in accordance with various aspects described herein.

FIG. 2C depicts an illustrative embodiment of a method 200c in accordance with various aspects described herein. The method 200c may be implemented/executed/practiced in accordance/conjunction/association with one or more systems, devices, and/or components, such as for example the systems, devices, and components described herein.

In block 202c, one or more images (e.g., image 208a of FIG. 2A), or data associated with the images, may be obtained. For example, as part of block 202c the one or more images may be captured via image capture equipment (e.g., image capture equipment 204a of FIG. 2A). As part of block 202c, the images may be obtained (e.g., transmitted and received) via one or more networks.

In block 206c, the image(s) obtained as part of block 202c may be applied to (e.g., may serve as an input to) one or more models (e.g., model 212a of FIG. 2A). Execution/Operation of the model(s) upon the image(s) in block 206c may result in an identification/classification of one or more objects (see FIG. 2A: object classification 216a). As part of block 206c, one or more image processing algorithms may be applied/executed/invoked relative to the image(s) to distinguish a first object (see, e.g., object 208b-1 of FIG. 2B) from one or more other objects (see, e.g., objects 208b-2 through 208b-4 of FIG. 2B). The image processing algorithm(s) may include one or more filters, such as for example a filter that removes background noise from the image(s).

In block 210c, one or more attributes of the objects of block 206c may be identified/recognized (see FIG. 2A: attribute recognition 220a). As part of block 210c, one or more image processing algorithms may be applied to an object (of block 206c) to distinguish a first attribute of the object from one or more other attributes of the object.

In block 214c, (first) data associated with a location of the objects (of block 206c) and/or (second) data associated with the attributes (of block 210c) may be obtained (see FIG. 2A: geo tagged data extraction 224a). The data of block 214c may supplement the identification/classification of the objects and the identification/recognition of the attributes. For example, the data of block 214c may serve to establish relationships between the objects and the attributes in some instances.

In block 218c, the identification/classification of the objects (of block 206c), the identification/recognition of the attributes (of block 210c) and the data (of block 214c) may be applied as (e.g., may serve as) inputs to a planning algorithm (see FIG. 2A: RAN planning component 228a). Based on those inputs (as well as potential other inputs as set forth above), the planning algorithm may recommend and/or select an object for receiving/locating one or more network resources. As part of block 218c, the planning algorithm may recommend and/or identify/select one or more operating parameters (e.g., a transmission power level, a frequency band, a modulation/demodulation scheme, an encoding/decoding scheme, an encryption/decryption scheme) of the network resource(s).

Figure 2D:
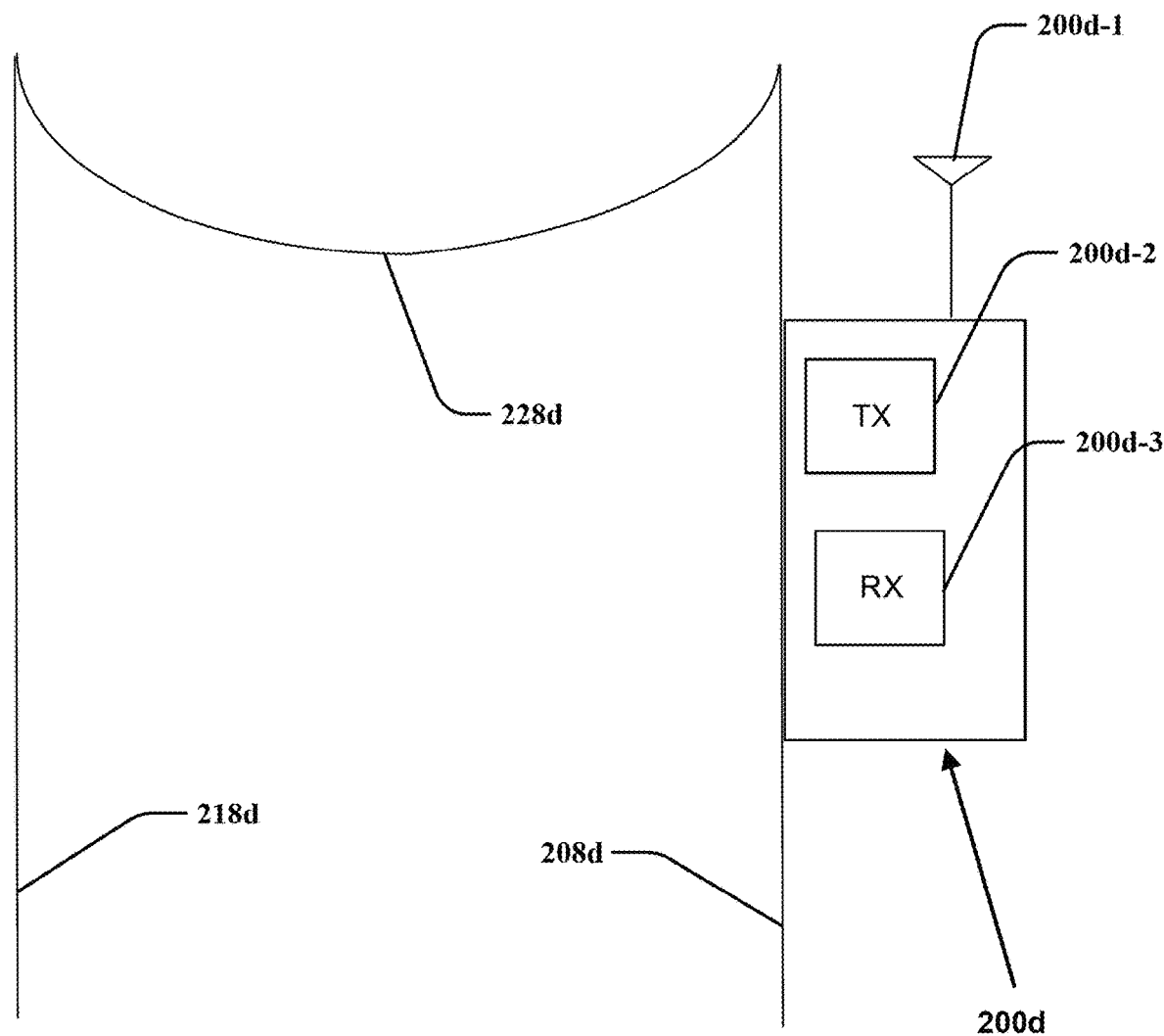
FIG. 2D depicts a deployment of a resource about an object in accordance with various aspects described herein.

In block 222c, the network resources may be placed/deployed on the object(s) selected as part of block 218c. For example, and as shown in FIG. 2D, a network resource 200d is shown as being placed on/about an object 208d (where the object 208d may correspond to one of the objects 208b-1 through 208b-4 of FIG. 2B). In an illustrative embodiment, the object 208d may correspond to a utility pole coupled to a second utility pole 218d via a transmission medium 228d. In the example of FIG. 2D, the resource 200d may include an antenna 200d-1, a transmitter (TX) 200d-2, and/or a receiver 200d-3. Other types of resources may be deployed as part of block 222c in some embodiments.

As part of block 222c, directions may be generated and presented in conjunction with a presentation device (e.g., a display device, a speaker, a print-out, etc.). The directions may advise a technician/operator of a geographical location where the object 208d is located relative to a current location of the technician/operator (e.g., driving directions to a site of the object 208d may be provided). The directions may identify the resource 200d (e.g., by a part number) and may provide an indication (e.g., a visual indication) of where the resource is to be placed on/about the object 208d. In some embodiments, the directions may include a video tutorial.

In block 226c, the model(s) (of block 206c) may be modified to generate one or more modified models. For example, the model(s) may be updated to account for the deployment of the network resource(s) as part of block 222c. The model(s) may be modified to incorporate one or more operating parameters associated with the deployed network resource(s).

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In some embodiments, aspects of the method 200c may be executed iteratively/repeatedly. For example, in some embodiments one or more blocks 200c may be executed as part of a loop. In this respect, various instances of images, attributes, and/or data may be obtained and/or identified to continue to assess network operability and performance, as well as identify opportunities for placement of additional resources.

Aspects of the disclosure may be used to facilitate a planning, development, implementation, and maintenance of one or more networks. For example, aspects of the disclosure may automate the procedure of identifying candidate locations to support network resources (e.g., network infrastructure) and selecting one or more locations from the candidate locations. In some embodiments, artificial intelligence (AI)/machine learning (ML) based models may be incorporated to facilitate the identification and/or selection of one or more locations. In some embodiments, such locations may include one or more buildings, building characteristics/objects (e.g., trusses, pilings, etc.), trees, roads, poles, signs (e.g., road signage), traffic indicators (e.g., traffic lights), etc.

In some embodiments, one or more locations/objects may be classified in accordance with the models. The models may be based, at least in part, on imagery. The imagery may be at least partially captured by a vehicle (e.g., an aircraft, spacecraft, or the like). In some embodiments, the imagery may be at least partially captured by a user equipment (UE), such as for example a handheld camera, a mobile device (e.g., a smartphone), etc. In some embodiments, the models may be based on (e.g., may be refined in accordance with) one or more user inputs.

In some embodiments, the models may be used to extract details/features/characteristics/parameters regarding a given location or object. For example, in relation to a building, the models may identify window/door placement, building materials, roof characteristics (e.g., slope/style of roof), etc.

Aspects of the disclosure may facilitate an efficient deployment and maintenance of network resources. For example, aspects of the disclosure may reduce (e.g., minimize) the number of site visits that may be required of technicians. Still further, aspects of the disclosure may be used to identify opportunities (e.g., locations/objects) for a deployment of resources that otherwise may have been overlooked/missed.

Aspects of the disclosure may leverage pre-existing image capture equipment (e.g., image capture equipment 204a of FIG. 2A) and/or images (e.g., images 208a of FIG. 2A) (which may be stored in, and may be accessible via, one or more databases) to identify and/or select one or more locations/objects for receiving network resources (e.g., network infrastructure). Stated slightly differently, aspects of this disclosure may be facilitated via a use of legacy/pre-existing equipment (which may initially have been deployed for reasons unrelated to network resource deployment/management), such that aspects of the disclosure may be implemented with little-to-no additional cost/overhead.

Aspects of the disclosure may be used to enrich a database of data regarding locations/objects for receiving network resources. In some embodiments, locations/objects that have demonstrated poor performance (e.g., performance that is less than a metric/threshold) may be removed/banned from serving as a candidate location/object in future deployments/implementations. In this respect, a log/history of locations/objects may assist a network/service operator/provider from incurring costly mistakes/rework.

In some embodiments, the models may be executed/exercised to identify/assess a prospective performance of network resources when deployed/implemented at a given location. While aspects of such model execution may provide insight into the performance of a specific network resource at the given location, the execution of the model may also identify the impact of one or more operations of the resource on other resources (at the same location and/or at other locations). For example, while a first resource may operate/function as intended at a first location, the first resource may negatively impact (e.g., may cause signal/message/communication interference in relation to) a second resource (at the first location or at a second location). In this regard, an execution of one or more models may assist engineers/technicians in identifying an impact of a deployment of a first resource on one or more additional resources. In this respect, aspects of the disclosure may facilitate a decision-making procedure at both the device/component level and the system/network level.

Aspects of this disclosure may facilitate an identification/selection of objects or locations for receiving/placing/mounting resources. Additionally, aspects of the disclosure may facilitate a maintenance of such objects, locations, and/or resources by proactively identifying when such maintenance should be performed (e.g., relative to a probability of inoperability of a resource exceeding a threshold), as well as identifying equipment and/or personnel needed to perform such maintenance. For example, in relation to the foliage 208b-4 of FIG. 2B, aspects of the disclosure may identify a particular crew of arborists to trim trees using gas-powered saws in proximity to the tower 208b-3 and schedule the tree trimming in advance of when a growth of the foliage 208b-4 would obstruct a line-of-sight of network communications equipment located on the tower 208b-3. In relation to the poles 208b-2, a frequency band of communication associated with a transmitter (e.g., TX 200d-2 of FIG. 2D) may be adjusted to account for an aging/drift of an oscillator of the transmitter over time.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200a, and method 200c presented in FIGS. 1, 2A, and 2C. For example, virtualized communication network 300 can facilitate in whole or in part obtaining an image that is sourced from a vehicle, applying the image to a model to identify a plurality of objects in the image, identifying a plurality of attributes associated with each of the plurality of objects, obtaining data, wherein the data identifies a location of each object of the plurality of objects, and selecting an object included in the plurality of objects for deployment of a communication network resource in accordance with the plurality of attributes and the data. Virtualized communication network 300 can facilitate in whole or in part obtaining a plurality of images, wherein the plurality of images is captured by a vehicle, a user equipment, or any combination thereof, identifying a first object included in the plurality of images via an application of the plurality of images to at least one model that comprises a machine learning model, identifying at least one attribute associated with the first object responsive to the identifying of the first object, generating a recommendation that identifies the first object or a second object for receiving a network resource responsive to the identifying of the at least one attribute, and presenting the recommendation on a presentation device. Virtualized communication network 300 can facilitate in whole or in part identifying a first object included in at least one image in accordance with an execution of an image processing algorithm, analyzing a plurality of parameters in accordance with at least one model responsive to the identifying of the first object included in the at least one image, wherein each parameter of the plurality of parameters is associated with the first object or a second object, selecting one of the first object or the second object for receiving at least one communication network resource responsive to the analyzing of the plurality of parameters, wherein the selecting results in a selected object, and presenting the selected object on a presentation device.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
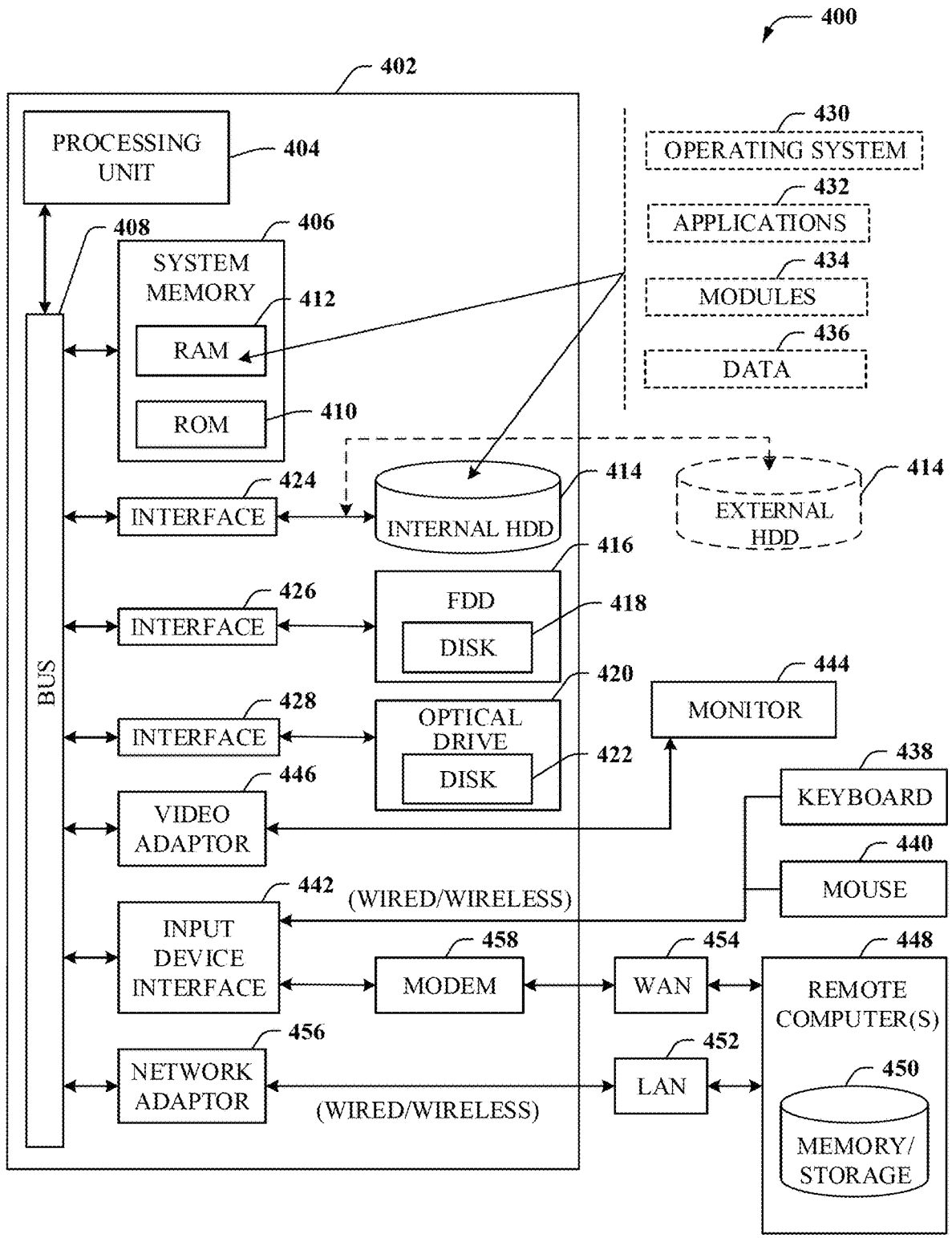
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining an image that is sourced from a vehicle, applying the image to a model to identify a plurality of objects in the image, identifying a plurality of attributes associated with each of the plurality of objects, obtaining data, wherein the data identifies a location of each object of the plurality of objects, and selecting an object included in the plurality of objects for deployment of a communication network resource in accordance with the plurality of attributes and the data. Computing environment 400 can facilitate in whole or in part obtaining a plurality of images, wherein the plurality of images is captured by a vehicle, a user equipment, or any combination thereof, identifying a first object included in the plurality of images via an application of the plurality of images to at least one model that comprises a machine learning model, identifying at least one attribute associated with the first object responsive to the identifying of the first object, generating a recommendation that identifies the first object or a second object for receiving a network resource responsive to the identifying of the at least one attribute, and presenting the recommendation on a presentation device. Computing environment 400 can facilitate in whole or in part identifying a first object included in at least one image in accordance with an execution of an image processing algorithm, analyzing a plurality of parameters in accordance with at least one model responsive to the identifying of the first object included in the at least one image, wherein each parameter of the plurality of parameters is associated with the first object or a second object, selecting one of the first object or the second object for receiving at least one communication network resource responsive to the analyzing of the plurality of parameters, wherein the selecting results in a selected object, and presenting the selected object on a presentation device.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
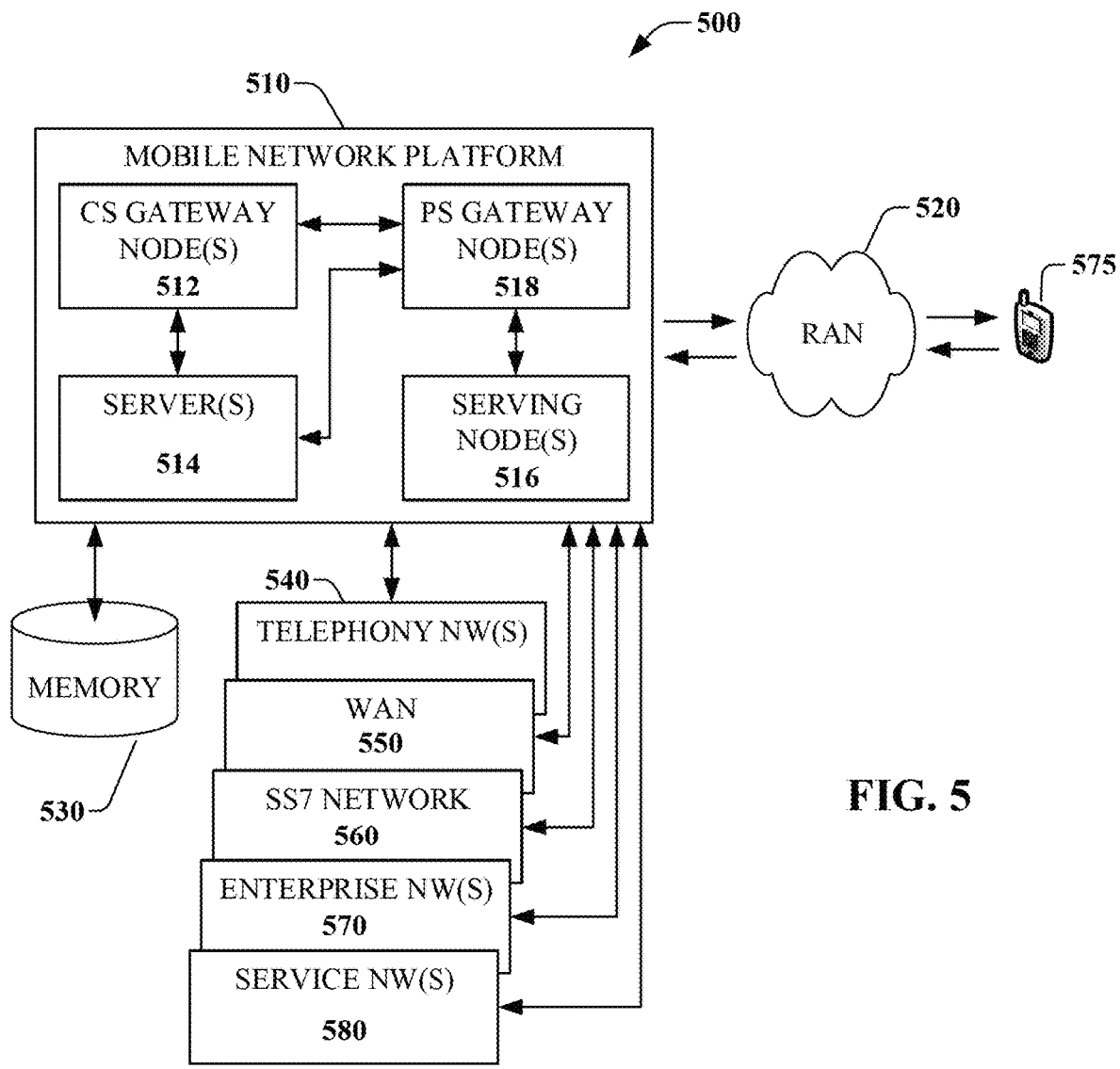
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining an image that is sourced from a vehicle, applying the image to a model to identify a plurality of objects in the image, identifying a plurality of attributes associated with each of the plurality of objects, obtaining data, wherein the data identifies a location of each object of the plurality of objects, and selecting an object included in the plurality of objects for deployment of a communication network resource in accordance with the plurality of attributes and the data. Platform 510 can facilitate in whole or in part obtaining a plurality of images, wherein the plurality of images is captured by a vehicle, a user equipment, or any combination thereof, identifying a first object included in the plurality of images via an application of the plurality of images to at least one model that comprises a machine learning model, identifying at least one attribute associated with the first object responsive to the identifying of the first object, generating a recommendation that identifies the first object or a second object for receiving a network resource responsive to the identifying of the at least one attribute, and presenting the recommendation on a presentation device. Platform 510 can facilitate in whole or in part identifying a first object included in at least one image in accordance with an execution of an image processing algorithm, analyzing a plurality of parameters in accordance with at least one model responsive to the identifying of the first object included in the at least one image, wherein each parameter of the plurality of parameters is associated with the first object or a second object, selecting one of the first object or the second object for receiving at least one communication network resource responsive to the analyzing of the plurality of parameters, wherein the selecting results in a selected object, and presenting the selected object on a presentation device.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
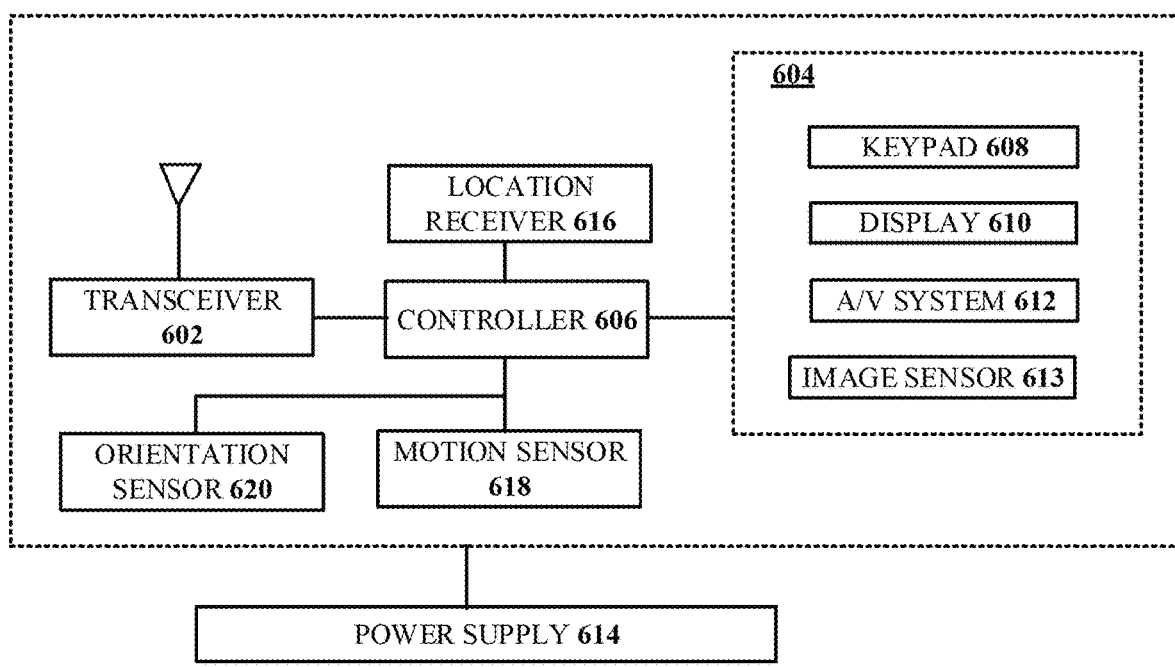
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining an image that is sourced from a vehicle, applying the image to a model to identify a plurality of objects in the image, identifying a plurality of attributes associated with each of the plurality of objects, obtaining data, wherein the data identifies a location of each object of the plurality of objects, and selecting an object included in the plurality of objects for deployment of a communication network resource in accordance with the plurality of attributes and the data. Computing device 600 can facilitate in whole or in part obtaining a plurality of images, wherein the plurality of images is captured by a vehicle, a user equipment, or any combination thereof, identifying a first object included in the plurality of images via an application of the plurality of images to at least one model that comprises a machine learning model, identifying at least one attribute associated with the first object responsive to the identifying of the first object, generating a recommendation that identifies the first object or a second object for receiving a network resource responsive to the identifying of the at least one attribute, and presenting the recommendation on a presentation device. Computing device 600 can facilitate in whole or in part identifying a first object included in at least one image in accordance with an execution of an image processing algorithm, analyzing a plurality of parameters in accordance with at least one model responsive to the identifying of the first object included in the at least one image, wherein each parameter of the plurality of parameters is associated with the first object or a second object, selecting one of the first object or the second object for receiving at least one communication network resource responsive to the analyzing of the plurality of parameters, wherein the selecting results in a selected object, and presenting the selected object on a presentation device.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   obtaining an image that is sourced from a vehicle;
   applying the image to a model to identify a plurality of objects in the image;
   identifying a plurality of attributes associated with each of the plurality of objects;
   obtaining data, wherein the data identifies a location of each object of the plurality of objects;
   selecting an object included in the plurality of objects for deployment of a communication network resource in accordance with the plurality of attributes and the data; and
   generating and presenting directions for the deployment of the communication network resource about the object, wherein the directions comprise driving directions to a geographical location where the object is located, an identification of the communication network resource by a part number, and a video tutorial that includes an indication of where the communication network resource is to be mounted about the object.

2. The device of claim 1, wherein the communication network resource comprises a transmitter, a receiver, and an antenna.

3. The device of claim 1, wherein the image is sourced from a first image captured by a fixed-wing aircraft and a second image captured by a satellite, and wherein the image comprises a composite of the first image and the second image.

4. The device of claim 1, wherein the plurality of objects comprises a building, a pole, a tower, and foliage.

5. The device of claim 4, wherein the plurality of attributes comprises a truss of the building, a piling of the building, a size of the building, a dimension of the building, a style of a roof of the building, a material of the roof, or any combination thereof.

6. The device of claim 4, wherein the plurality of attributes comprises a dimension of the pole, an attachment mechanism present on the pole when the image was captured, a transmission medium present on the pole when the image was captured, a signaling equipment present on the pole when the image was captured, a material of the pole, or a combination thereof.

7. The device of claim 4, wherein the plurality of attributes comprises a dimension of the tower, an attachment mechanism present on the tower when the image was captured, communications equipment present on the tower when the image was captured, a material of the tower, or a combination thereof.

8. The device of claim 4, wherein the plurality of attributes comprises a dimension of the foliage, a density of the foliage, a type of plant associated with the foliage, or a combination thereof.

9. The device of claim 1, wherein the operations further comprise:
scheduling a maintenance activity with respect to at least one of the plurality of objects, the communication network resource, or a combination thereof, in accordance with the plurality of attributes, wherein the scheduling comprises an identification of personnel to perform the maintenance activity and equipment needed to perform the maintenance activity.

10. The device of claim 1, wherein the operations further comprise:
selecting an operating parameter for the communication network resource in accordance with the plurality of attributes and the data.

11. The device of claim 10, wherein the operating parameter comprises a transmission power level, a frequency band, a modulation scheme, a demodulation scheme, an encoding scheme, a decoding scheme, an encryption scheme, a decryption scheme, or a combination thereof.

12. The device of claim 1, wherein the data comprises an identification of a proximity of each object of the plurality of objects to a cable bundle, an optical fiber trunk, a repeater, a coupler, or any combination thereof.

13. The device of claim 1, wherein the data comprises a specification of a restriction imposed by a jurisdiction, a governmental entity, or a private party in respect of a placement of the communication network resource about at least one object included in the plurality of objects.

14. A non-transitory machine-readable medium, comprising executable instructions that, when executed by a processing system including a processor, facilitate performance of operations, the operations comprising:
obtaining an image;
applying the image to a model to identify a plurality of objects in the image;
identifying a plurality of attributes associated with each of the plurality of objects;
obtaining data, wherein the data identifies a location of each object of the plurality of objects;
selecting an object included in the plurality of objects for a deployment of a network resource based on the plurality of attributes and the data;
modifying the model subsequent to the deployment of the network resource to generate a modified model, wherein the modified model is based on an operating parameter of the network resource;
obtaining a second image subsequent to the modifying of the model;
identifying a second object included in the second image via an application of the second image to the modified model;
identifying an attribute associated with the second object based on the identifying of the second object; and
selecting the second object for a deployment of a second network resource based on the attribute associated with the second object.

15. The non-transitory machine-readable medium of claim 14, wherein the object is one of a building, a pole, or a tower.

16. The non-transitory machine-readable medium of claim 14, wherein the network resource is associated with a communication system, wherein the network resource comprises an antenna, a transmitter, a receiver, or any combination thereof, wherein the operations further comprise:
obtaining second data associated with at least one signal quality parameter of the communication system, wherein the at least one signal quality parameter refers to a received signal strength, interference, noise, or any combination thereof,
wherein the selecting of the object is further based on an analysis of the second data.

17. A method, comprising:
applying, by a processing system including a processor, an image to a model to identify a plurality of objects in the image;
identifying, by the processing system, a plurality of attributes associated with each of the plurality of objects;
obtaining, by the processing system, data that identifies a location of each object of the plurality of objects;
selecting, by the processing system, an object included in the plurality of objects for a deployment of a network resource based on the plurality of attributes and the data;
modifying the model subsequent to the deployment of the network resource to generate a modified model, wherein the modified model is based on an operating parameter of the network resource;
identifying a second object included in a second image via an application of the second image to the modified model;
identifying an attribute associated with the second object based on the identifying of the second object; and
selecting the second object for a deployment of a second network resource based on the attribute associated with the second object.

18. The method of claim 17, wherein the applying of the image to the model includes filtering background noise included in the image, the method further comprising:
identifying, by the processing system, a third object in the image; and
analyzing, by the processing system, second data that identifies a restriction with respect to a placement of the network resource about the third object,
wherein the selecting of the object for the deployment of the network resource is further based on the restriction.

19. The method of claim 17, further comprising:
generating and presenting, by the processing system, directions for the deployment of the network resource about the object.

20. The method of claim 19, wherein the directions comprise: driving directions to a geographical location where the object is located, an identification of the network resource by a part number, a video tutorial that includes an indication of where the network resource is to be mounted about the object, or any combination thereof.

* * * * *